(12) United States Patent
Hahn et al.

(10) Patent No.: US 12,345,883 B2
(45) Date of Patent: Jul. 1, 2025

(54) AUGMENTED REALITY DISPLAY HAVING A THIN OPTICAL COMBINER

(71) Applicants: KYUNGPOOK NATIONAL UNIVERSITY INDUSTRY-ACADEMIC COOPERATION FOUNDATION, Daegu (KR); KOREA UNIVERSITY RESEARCH AND BUSINESS FOUNDATION, SEJONG CAMPUS, Sejong (KR)

(72) Inventors: Joon Ku Hahn, Daegu (KR); Hwi Kim, Seoul (KR); Young Jin Jeon, Sejong (KR); Sang Yoon Kim, Seongnam-si (KR); Ho Sung Jeon, Daegu (KR)

(73) Assignees: KYUNGPOOK NATIONAL UNIVERSITY INDUSTRY-ACADEMIC COOPERATION FOUNDATION, Daegu (KR); KOREA UNIVERSITY RESEARCH AND BUSINESS FOUNDATION, SEJONG CAMPUS, Sejong (KR)

( * ) Notice: Subject to any disclaimer, the term of this patent is extended or adjusted under 35 U.S.C. 154(b) by 522 days.

(21) Appl. No.: 17/641,667

(22) PCT Filed: Jan. 27, 2021

(86) PCT No.: PCT/KR2021/001058
§ 371 (c)(1),
(2) Date: Mar. 9, 2022

(87) PCT Pub. No.: WO2022/154155
PCT Pub. Date: Jul. 21, 2022

(65) Prior Publication Data
US 2022/0404619 A1    Dec. 22, 2022

(30) Foreign Application Priority Data

Jan. 15, 2021    (KR) .................. 10-2021-0006175

(51) Int. Cl.
*G02B 27/01*    (2006.01)
*G02B 27/28*    (2006.01)

(52) U.S. Cl.
CPC ..... *G02B 27/0103* (2013.01); *G02B 27/0179* (2013.01); *G02B 27/283* (2013.01)

(58) Field of Classification Search
CPC .. G02B 27/01; G02B 27/017; G02B 27/0101; G02B 27/0103; G02B 27/0172;
(Continued)

(56) References Cited

U.S. PATENT DOCUMENTS 10,495,798 B1 * 12/2019 Peng .................. G02B 27/01
2017/0003505 A1    1/2017 Vallius et al.
(Continued)

FOREIGN PATENT DOCUMENTS

JP    S58-184118 A    10/1983
JP    2000-511306 A    8/2000
(Continued)

*Primary Examiner* — Sultan Chowdhury
(74) *Attorney, Agent, or Firm* — Bridgeway IP Law Group, PLLC; Sang Ho Lee; Hyun Woo Shin

(57) ABSTRACT

Provided is an augmented reality display with a thin optical combiner, and the augmented reality display with a thin optical combiner provided to have an overall shape wearable by a user includes an optical combiner part provided in the form of a lens located in front of a user's eyes to receive a virtual image light wave and combine an external scene and a virtual image, wherein the optical combiner part includes a plurality of glass substrates, and a polarization-dependent lens inserted obliquely in a diagonal direction between the plurality of glass substrates to transmit optically modulated virtual image light waves in a direction toward the eyes.

14 Claims, 15 Drawing Sheets

(58) Field of Classification Search
CPC .... G02B 27/0179; G02B 27/283; G02B 5/00; G02B 5/04; G02B 5/32; G02B 5/1866; G02B 5/1871; G02B 5/1876; G02B 3/00; G02B 3/14; G02B 7/00; G02B 7/02; G02B 7/021

See application file for complete search history.

(56) References Cited

U.S. PATENT DOCUMENTS

| | | | |
|---|---|---|---|
| 2020/0049992 A1* | 2/2020 | Peng | G06F 3/012 |
| 2020/0292830 A1* | 9/2020 | Fei | G02B 27/288 |
| 2020/0301134 A1* | 9/2020 | Allen | G02B 27/0075 |
| 2021/0356774 A1* | 11/2021 | Nakanishi | G02F 1/133528 |

FOREIGN PATENT DOCUMENTS

| | | |
|---|---|---|
| KR | 10-0591113 B1 | 6/2006 |
| KR | 10-1257125 B1 | 4/2013 |
| KR | 10-2015-0012371 A | 2/2015 |
| KR | 10-2015-0020803 A | 2/2015 |
| KR | 10-2016-0116145 A | 10/2016 |
| KR | 10-2017-0010042 A | 1/2017 |
| KR | 10-2017-0087590 A | 7/2017 |
| KR | 10-2019-0016869 A | 2/2019 |
| KR | 10-2019-0081864 A | 7/2019 |
| KR | 10-2020-0031922 A | 3/2020 |
| KR | 10-2020-0102904 A | 9/2020 |
| KR | 10-2020-0105687 A | 9/2020 |

* cited by examiner

AUGMENTED REALITY DISPLAY HAVING A THIN OPTICAL COMBINER

TECHNICAL FIELD

The present invention relates to an augmented reality display with a thin optical combiner, and more specifically, to an augmented reality display with a thin optical combiner to which an optical combiner thinner than a conventional optical combiner is applied.

BACKGROUND ART

Generally, three-dimensional image reproduction technology includes stereoscopy method, holography method, and integral imaging method.

Among the above, the holography method is a method in which an observer observes a virtual stereoscopic image while looking at a hologram at a predetermined distance from a front of the hologram when a light source is illuminated on the hologram. As an invention using this, hologram glasses which can be worn by a user such as Korean Patent Application Publication No. 10-2016-0116145 "Head mounted display (HMD) using a transmissive hologram" have been developed.

Here, a method of dividing a beam generated from a laser into two beams, and then allowing one beam to directly illuminate a screen and allowing the other beam to illuminate a target object has been used as the principle for providing a hologram to a user. In this case, a beam which directly illuminates the screen is referred to as a reference wave, and a beam which illuminates the object is referred to as an object wave.

Since the object wave is a beam reflected from each surface of the object, a phase difference differently appears according to the distance from the surface of the object to the screen.

In this case, an interference pattern generated when an undeformed reference wave interferes with the object wave is stored on the screen, and a film in which such interference pattern is stored is referred to as a hologram.

A general cube-shaped light distributor mainly used here serves to combine an external scene and a virtual image, and the external scene passes through a cube beam splitter and enters the eyes.

Then, after the virtual image is optically modulated by a spatial light modulator (SLM), light waves are collected through a lens, and then the virtual image enters the eyes after being bent by an interface located at 45 degrees in the cube beam splitter.

In this case, virtual images are gathered at one point in front of the eyes so that a Fourier domain is created in front of the eyes, and pupils of the eyes act as an optical filter which allows only the Nyquist region to pass therethrough when an angle at which virtual images are gathered in front of the eyes determines a viewing angle of the display, and optical modulation is performed by applying holography technology.

However, in the case of a light distributor disclosed in Korean Registration Patent No. 10-1257125 "Polarization beam splitter and method of correcting stress birefringence in system using the same", and in a general cube-shaped light distributor disclosed in Korean Registration Patent No. 10-0591113 "Wide-angle Rugate polarizing beam splitter and manufacturing method thereof", a thickness of the cube beam splitter is thick because the lengths of a side surface and a front surface are the same in a cube shape, and accordingly, there is a problem in that widening a user's viewing angle is limited.

Further, in the method using a reflective holographic optical element (HOE), the reflective HOE is attached to a hard glass surface to maintain a shape thereof, and accordingly, an external scene enters the eyes through the reflective HOE, and reflective HOE serves to reflect the virtual images and gather the virtual images in front of the eyes.

However, in the case of the reflective HOE, since unwanted light reflected from a HOE surface and a glass surface can enter the eye, and an optical path is exposed to a free space, the reflective HOE is sensitive to changes in the external environment, and since the HOE is exposed, there is a problem in that contamination or damage can occur.

Accordingly, in order to solve the above-described problems, there is an urgent need for developing a technology related to an augmented reality display with a thin optical combiner that is thinner and thus lighter and is easier to use than the conventional optical combiner by combining an optical combiner having a structure in which a metalens or HOE is inserted into glass forming the display.

DISCLOSURE

Technical Problem

To solve the above-mentioned problems, the present invention has been devised through a project: an augmented-reality holographic near-eye display, grant number: SRFC-IT1301-52, and the present disclosure according to an embodiment of the present invention is directed to providing an augmented reality display with a thin optical combiner having an advantage of being simple and light to be used by a user while providing an optical combiner thinner than a conventional optical combiner.

Technical Solution

In an augmented reality display with a thin optical combiner provided to have an overall shape wearable by a user to solve the above problems, the augmented reality display with a thin optical combiner includes an optical combiner part provided in the form of a lens located in front of a user's eyes to receive a virtual image light wave and combine an external scene and a virtual image, wherein the optical combiner part includes a plurality of glass substrates, and a polarization-dependent lens inserted obliquely in a diagonal direction between the plurality of glass substrates to transmit optically modulated virtual image light waves in a direction toward the eyes.

Further, the optical combiner part may further include: a spatial light modulator (SLM) configured to optically modulate the virtual image light waves to transmit the modulated virtual image light waves to the polarization-dependent lens; and a light distributor configured to distribute the virtual image light waves to be optically modulated through the SLM to the SLM.

In addition, the polarization-dependent lens may be provided as a reflective polarization-dependent lens or a transmissive polarization-dependent lens.

In addition, the SLM may include: an optical fiber configured to transmit the virtual image light waves; a collimator configured to convert the virtual image light waves transmitted from the optical fiber to a parallel light source; and a polarization filter configured to receive the parallel light source generated by the collimator to transmit a wavelength in a specific state in a direction toward the light distributor, and block other wavelengths.

In addition, the polarization-dependent lens may be provided so that an angle may be variable with respect to the middle of the polarization-dependent lens.

In addition, the augmented reality display with a thin optical combiner may further include a user modification module configured to vary a position and an angle of the optical combiner part according to a position of the user's eyes, wherein the user modification module may include an interval adjustment part configured to adjust an interval between the polarization-dependent lenses provided as a pair, and an angle adjustment part provided at both ends of a coupling part between the polarization-dependent lenses provided as a pair to adjust an angle of the polarization-dependent lenses.

In addition, the augmented reality display with a thin optical combiner may further include a user terminal showing a screen viewed by a user using the augmented reality display with a thin optical combiner.

In addition, the augmented reality display with a thin optical combiner may further include a variable shielding film drawn out in a direction toward a user's face to block interference light which penetrates at a side surface between the augmented reality display with a thin optical combiner and the user's face Advantageous Effects An augmented reality display with a thin optical combiner according to an embodiment of the present invention has an advantage of being simple and light to be used by a user as an optical combiner thinner than a conventional optical combiner is provided.

Further, a spatial light modulator (SLM) of an augmented reality display with a thin optical combiner according to an embodiment of the present invention includes a polarization filter which transmits polarized light in a specific state, and blocks other wavelengths, and thus it has an advantage of being capable of providing a high-resolution synthetic image.

In addition, an augmented reality display with a thin optical combiner according to an embodiment of the present invention varies an angle and an interval of polarization-dependent lenses which synthesize an image, and thus is variable and has excellent compatibility even when a position and a height of a user's eyes are changed.

In addition, an augmented reality display with a thin optical combiner according to an embodiment of the present invention further includes a variable shielding film to block interference light which penetrates at a side surface between the augmented reality display with a thin optical combiner and a user's face, and thus has an advantage of excellent visibility.

DESCRIPTION OF DRAWINGS

FIG. 3 is an exemplary view illustrating a case in which FIG. 2 is viewed from above.

FIG. 15 is an exemplary view illustrating a case in which FIG. 14 is viewed from above.

MODES OF THE INVENTION

Figure 1:
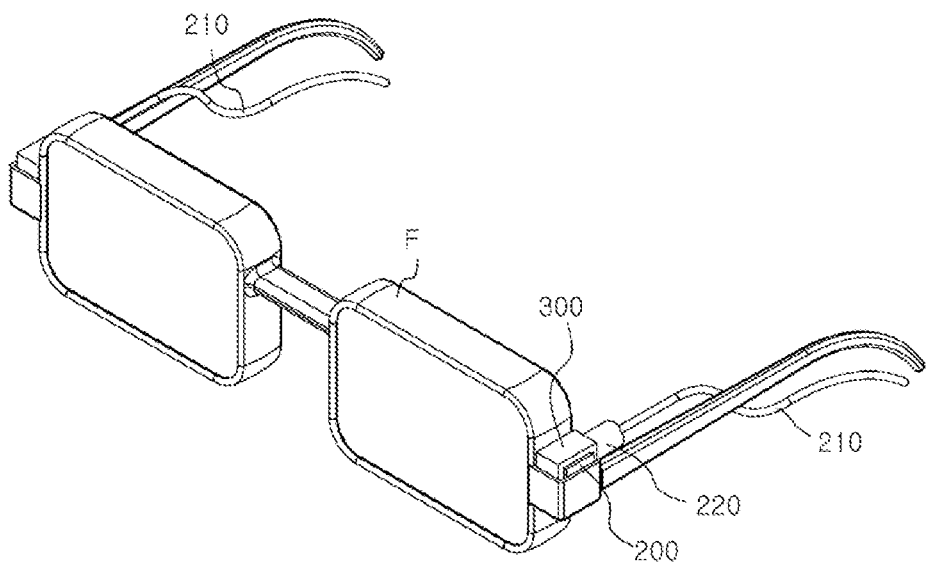
FIG. 1 is an exemplary view of an augmented reality display with a thin optical combiner according to an embodiment of the present invention.

Hereinafter, the description of the present invention with reference to the drawings is not limited to specific embodiments, and various changes may be applied and various embodiments may be provided. Further, it should be understood that the contents which will be described below include all changes, equivalents, and substitutes included in the spirit and scope of the present invention.

In the following descriptions, terms such as first, second, and the like are terms used to describe various components, their meanings are not limited thereto, and the terms are used only for the purpose of distinguishing one component from other components.

The same reference numerals are used for the same or similar components throughout the description.

A singular form also includes a plural form, unless the context clearly indicates otherwise. Further, it should be further understood that the terms "include," "including," "provide," "providing," "have," and/or "having" specify the presence of stated features, integers, steps, operations, elements, components, and/or a combination thereof but do not preclude the presence or addition of one or more other features, integers, steps, operations, elements, components, and/or a combination thereof.

Unless otherwise defined, all terms used herein, including technical or scientific terms, have the same meaning as generally understood by those skilled in the art. Terms such as terms defined in generally used dictionaries should be interpreted as having meanings consistent with the meanings in the context of the related art, and should not be interpreted in an idealistic or excessively formal sense unless otherwise defined in the present application.

Further, in the description with reference to the accompanying drawings, the same reference numerals are granted to the same components regardless of the drawing numerals, and overlapping descriptions thereof will be omitted. In the description of the present invention, when it is determined that a detailed description of a related known technology may unnecessarily obscure the principle of the present invention, the detailed description thereof will be omitted.

Hereinafter, an augmented reality display 1 with a thin optical combiner according to an embodiment of the present invention will be described in detail with reference to FIGS. 1 to 21.

Figure 2:
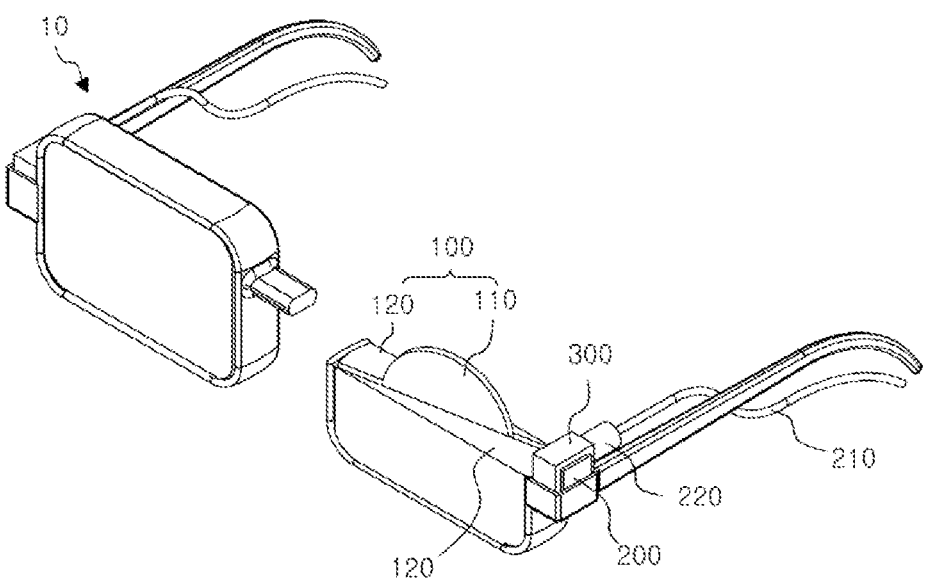
FIG. 2 is a partial cross-sectional view of the augmented reality display with a thin optical combiner shown in FIG. 1.
Figure 3:
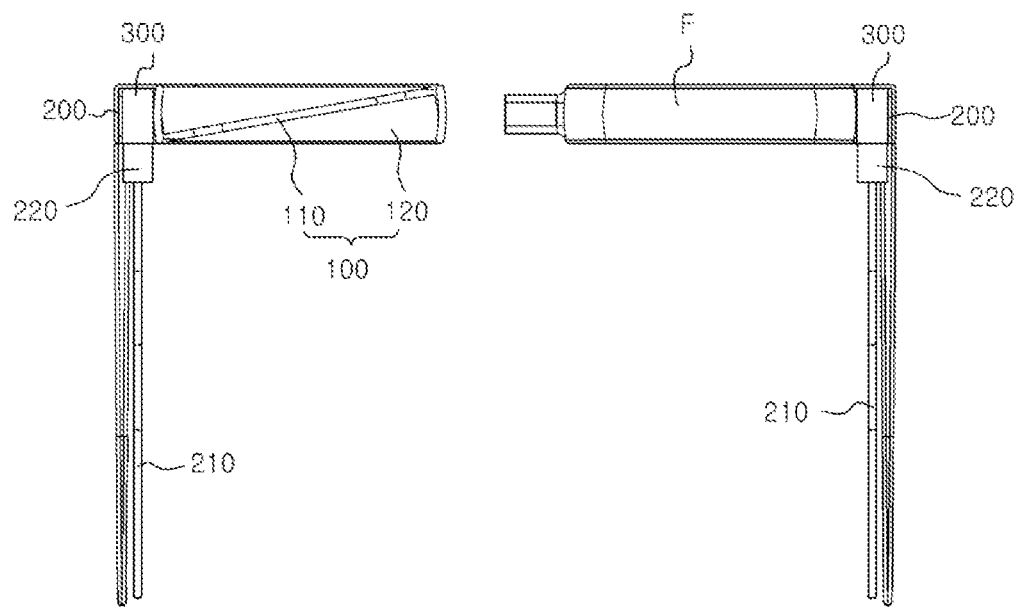
Figure 4:
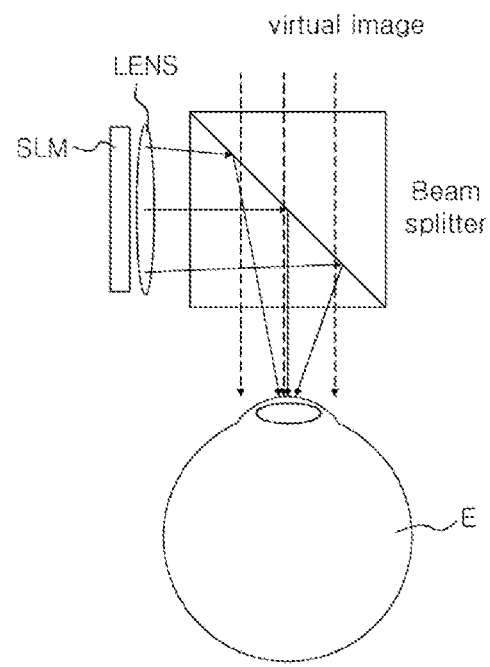
FIG. 4 is an exemplary view of a bird-bath type combiner.
Figure 5:
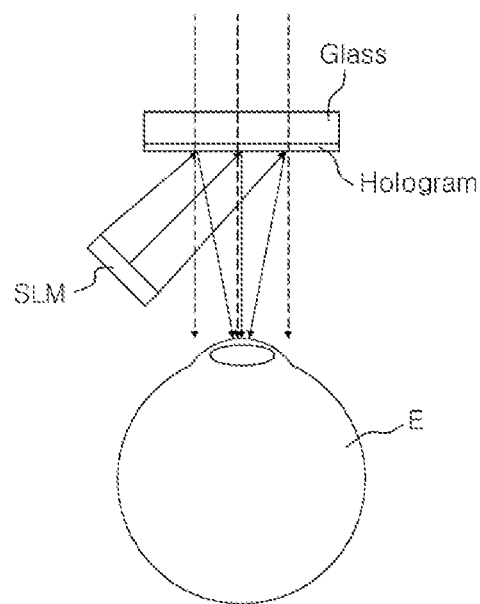
FIG. 5 is an exemplary view of an off-axis holographic optical element (HOE) reflective combiner.
Figure 6:
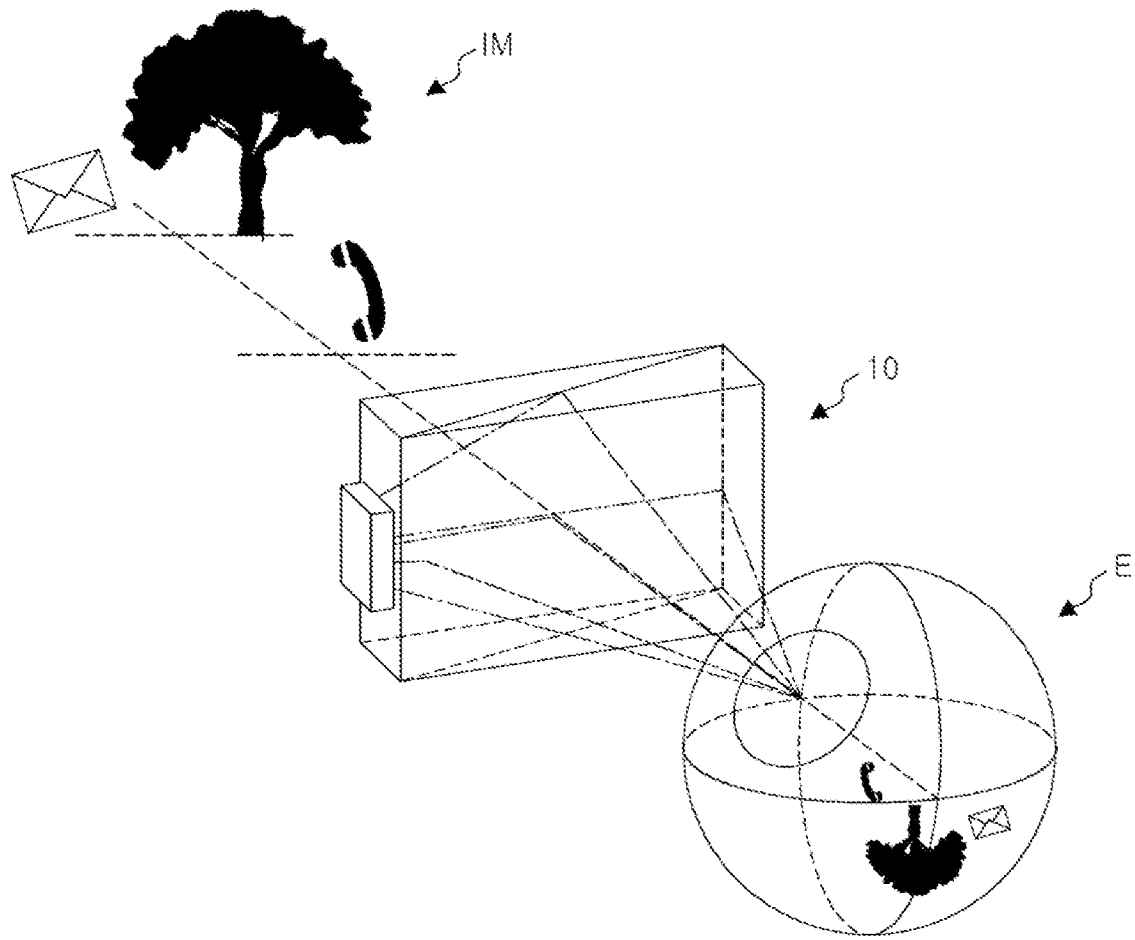
FIG. 6 is an exemplary view schematically illustrating a case in which the augmented reality display with a thin optical combiner according to the embodiment of the present invention configures a screen.
Figure 9:
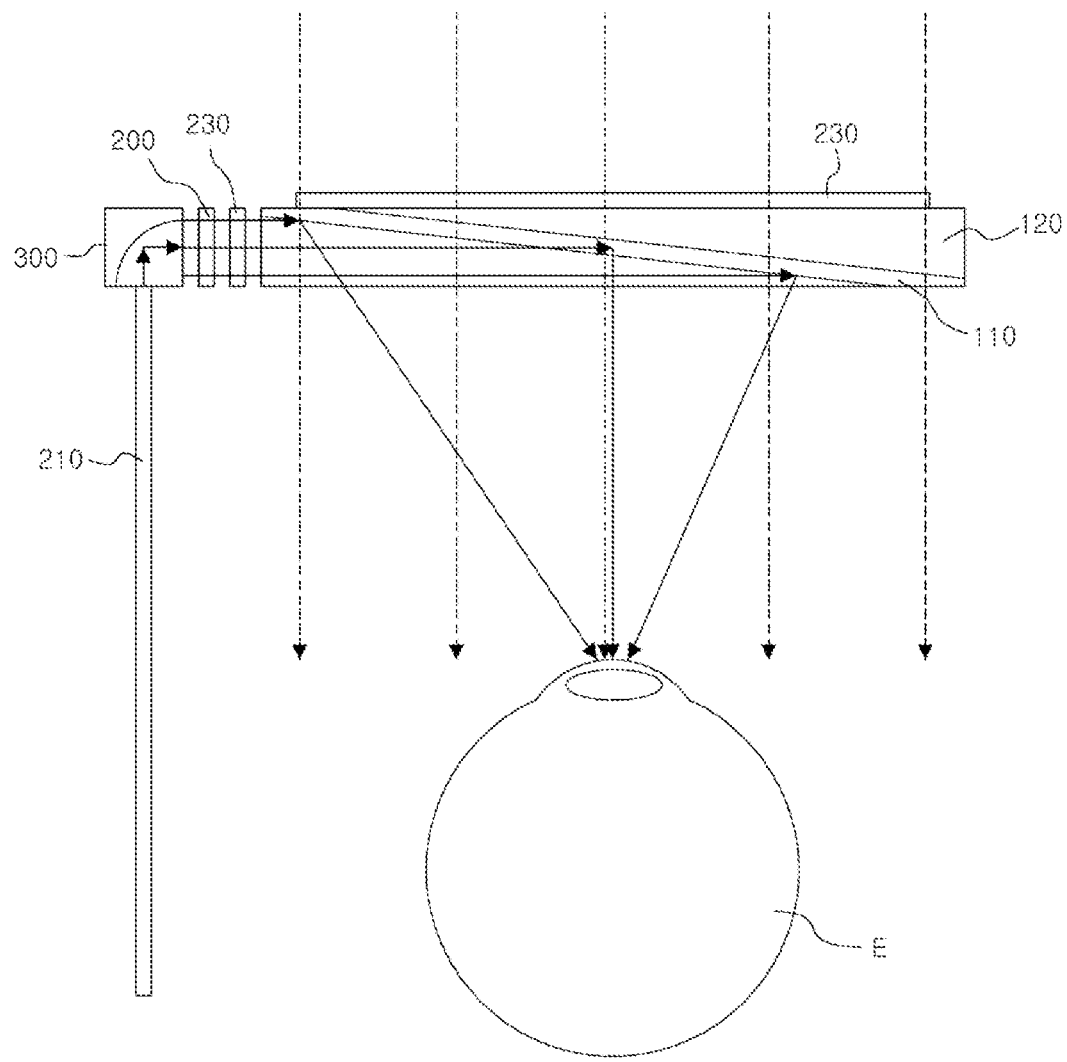
Figure 10:
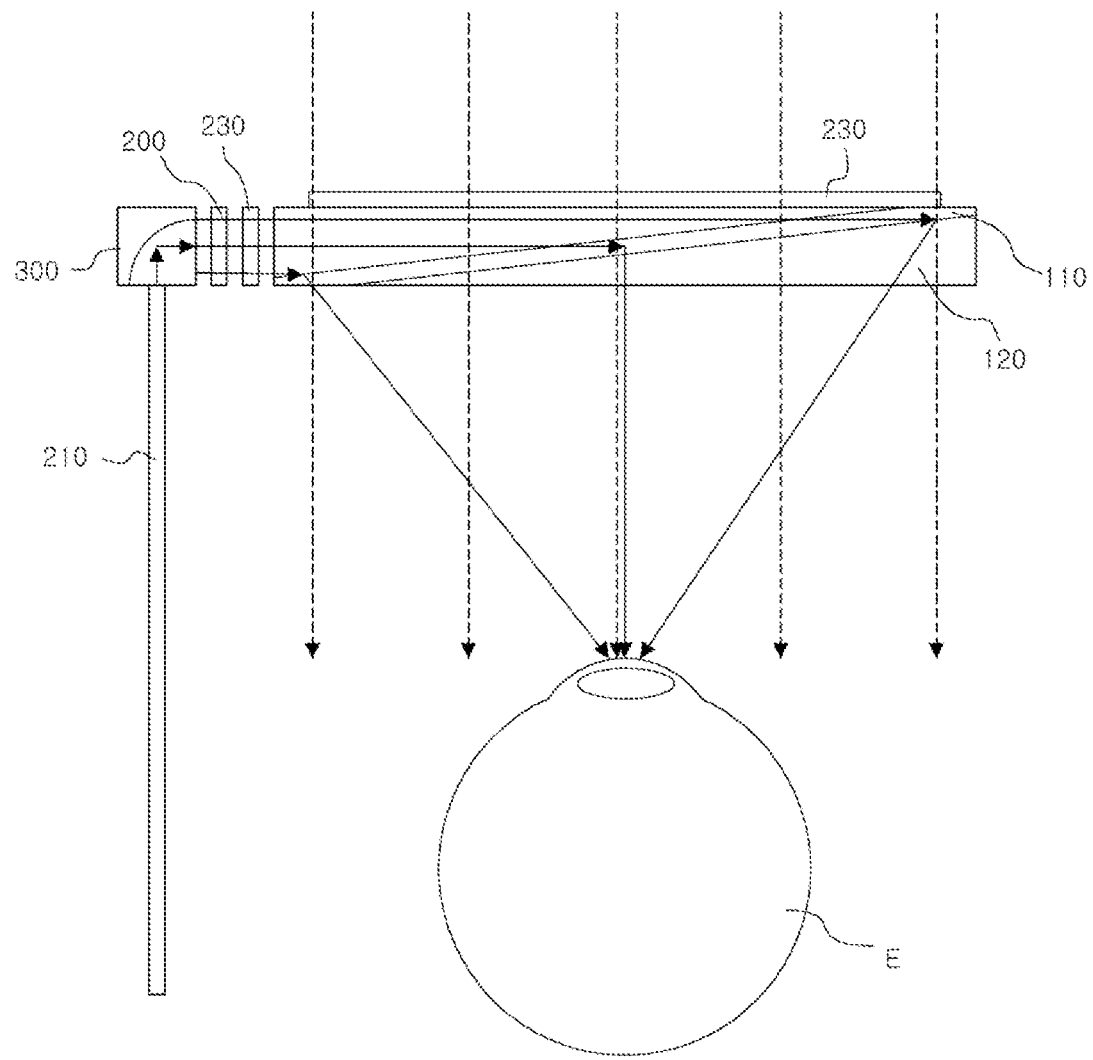
Figure 11:
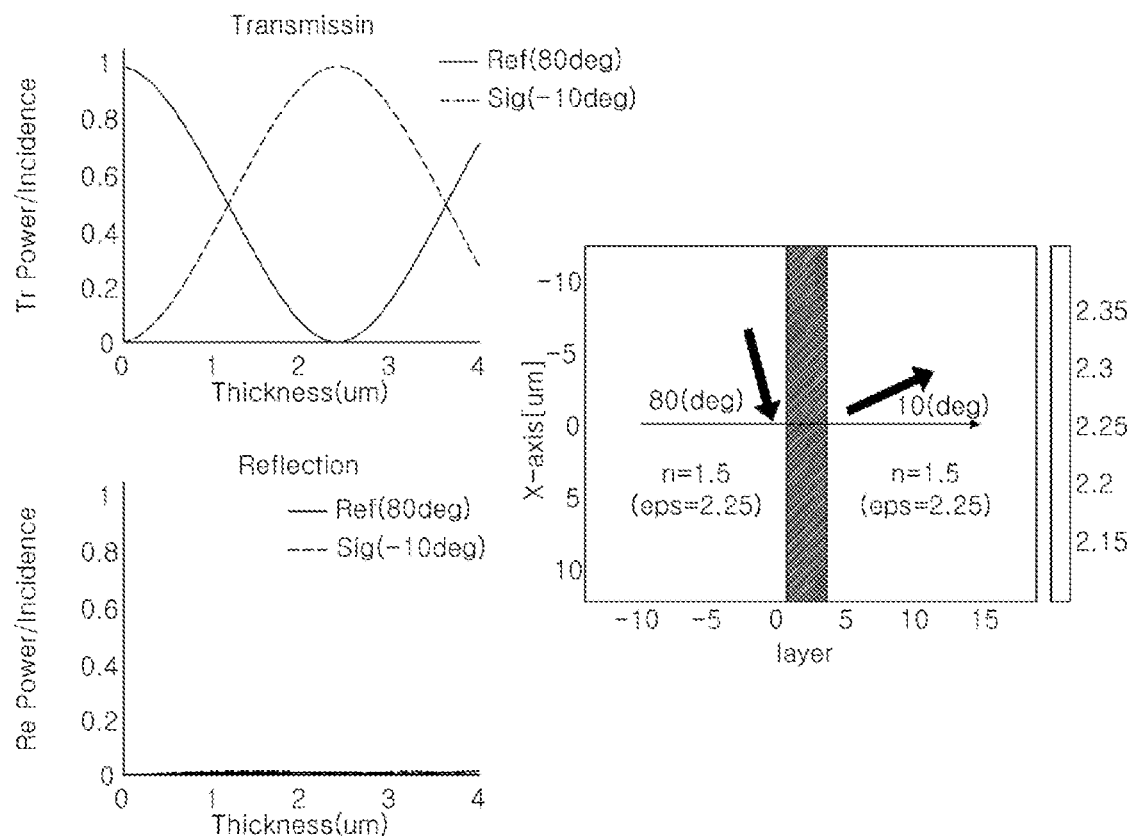
FIG. 11 is an exemplary view illustrating the energy of reference light and signal light according to a change in a thickness of a hologram medium according to the embodiment of the present invention.
Figure 12:
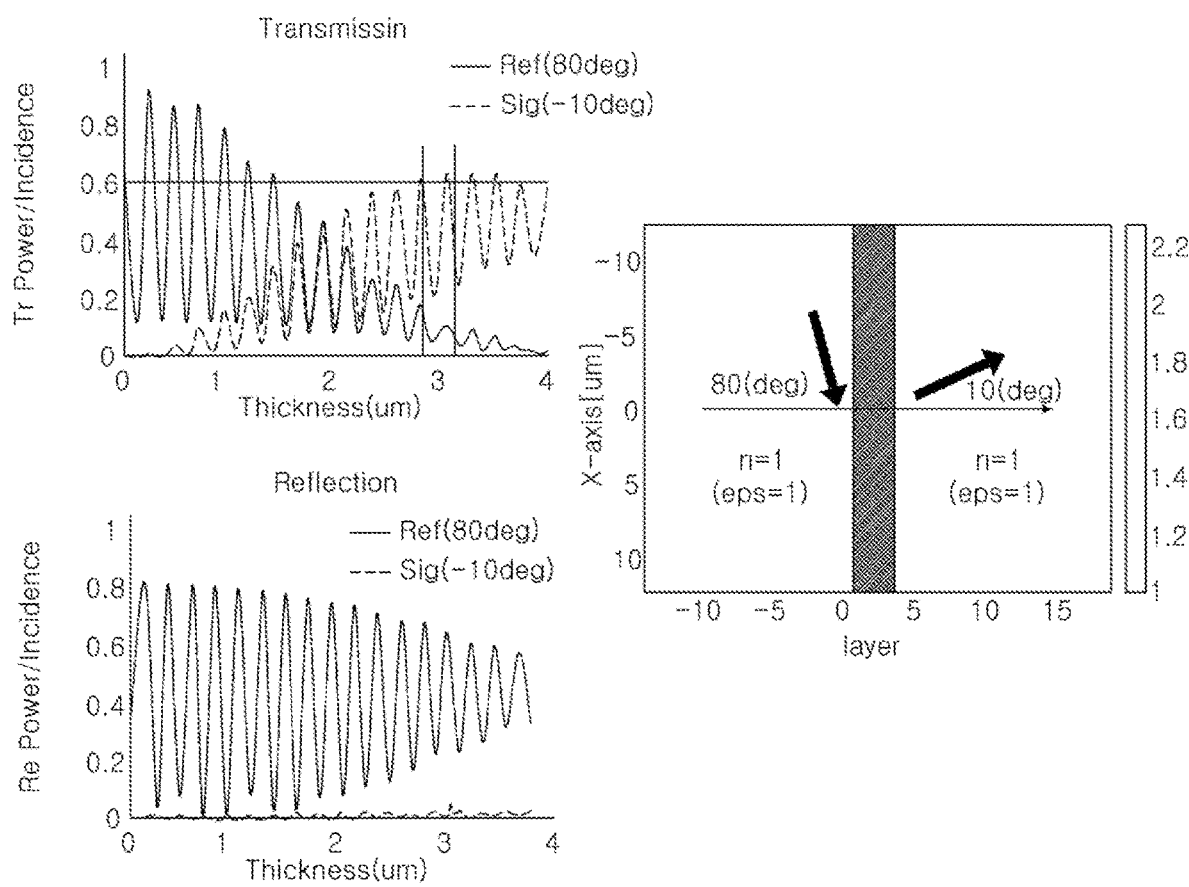
FIG. 12 is an exemplary view illustrating the energy of reference light and signal light according to a change in a thickness of a conventional hologram medium.

First, FIG. 1 is an exemplary view of an augmented reality display with a thin optical combiner according to an embodiment of the present invention, FIG. 2 is a partial cross-sectional view of the augmented reality display with a thin optical combiner shown in FIG. 1, FIG. 3 is an exemplary view illustrating a case in which FIG. 2 is viewed from above, FIG. 4 is an exemplary view of a bird-bath type combiner, FIG. 5 is an exemplary view of an off-axis holographic optical element (HOE) reflective combiner, FIG. 6 is an exemplary view schematically illustrating a case in which the augmented reality display with a thin optical combiner according to the embodiment of the present invention configures a screen, FIGS. 7 to 10 are exemplary views illustrating a configuration of a spatial light modulator (SLM) according to the embodiment of the present invention, FIG. 11 is an exemplary view illustrating the energy of reference light and signal light according to a change in a thickness of a hologram medium according to the embodiment of the present invention, and FIG. 12 is an exemplary view illustrating the energy of reference light and signal light according to a change in a thickness of a conventional hologram medium.

Referring to FIGS. 1 to 12, the augmented reality display 1 with a thin optical combiner according to the embodiment of the present invention provided so that an overall shape thereof can be worn by a user may include an optical combiner part 100.

Prior to description, the augmented reality display 1 with a thin optical combiner according to the embodiment of the present invention which will be described below may be provided in the shape of glasses which can be worn by a user as shown in the drawings, but this is only one example for helping understanding, and is not necessarily limited, and the augmented reality display 1 may include all devices or means which may be located in front of a user's eyes E to display an image.

Here, the optical combiner part 100 may be provided in the form of a lens located in front of the user's eyes E and may receive virtual image light waves to combine an external scene and a virtual image.

To this end, the optical combiner part 100 may include a polarization-dependent lens 110, an SLM 200, and a light distributor 300.

First, the polarization-dependent lens 110 is inserted obliquely in a diagonal direction in a glass substrate to transmit optically modulated virtual image light waves in a direction toward the eyes, and in order to implement this with a smaller thickness than a conventional optical combiner, the polarization-dependent lens 110 may be provided in an inclined state at an angle of 45 degrees or less as shown in FIG. 3.

More specifically, since the optical combiner part 100 is provided so that glass substrates 120 each having a right-angled triangle shape intersect each other with respect to the polarization-dependent lens 110 having an inclined angle, an overall shape of the optical combiner part 100 may be formed in a rectangular shape.

Further, the polarization-dependent lens 110 may be provided in the configuration of a metalens or HOE film, and more specifically, it may be provided in the configuration of a reflective HOE, a metalens optical combiner or transmissive HOE, and a metalens optical combiner.

In addition, the SLM 200 may transmit the modulated virtual image light waves to the polarization-dependent lens 110 after optical modulation of the virtual image light waves.

Specifically, the SLM 200 broadly refers to all types of devices which modulate light according to a position, shadow art using a beam projector and a shadow may also be seen as an example of using spatial light modulation, and the SLM 200 may refer to a device which realizes a different phase of light according to a position.

Here, the SLM 200 may be composed of an optical fiber 210, a collimator 220, and a polarization filter 230.

First, the optical fiber 210 may supply the virtual image light waves.

Further, the collimator 220 may convert the virtual image light waves supplied from the optical fiber 210 to a parallel light source.

In addition, the polarization filter 230 may transmit polarized light in a specific state, and block other wavelengths.

In this case, as shown in FIGS. 7 to 10, the polarization filter 230 may be provided between the collimator 220 and the light distributor 300 or in front of the glass substrates 120, and thus unnecessary interference light may be removed when transmitting the virtual image in the direction toward the eyes E.

Further, the light distributor 300 may distribute the virtual image light waves toward the SLM 200 or distribute light waves optically modulated by the SLM 200 toward the polarization-dependent lens 110.

Figure 7:
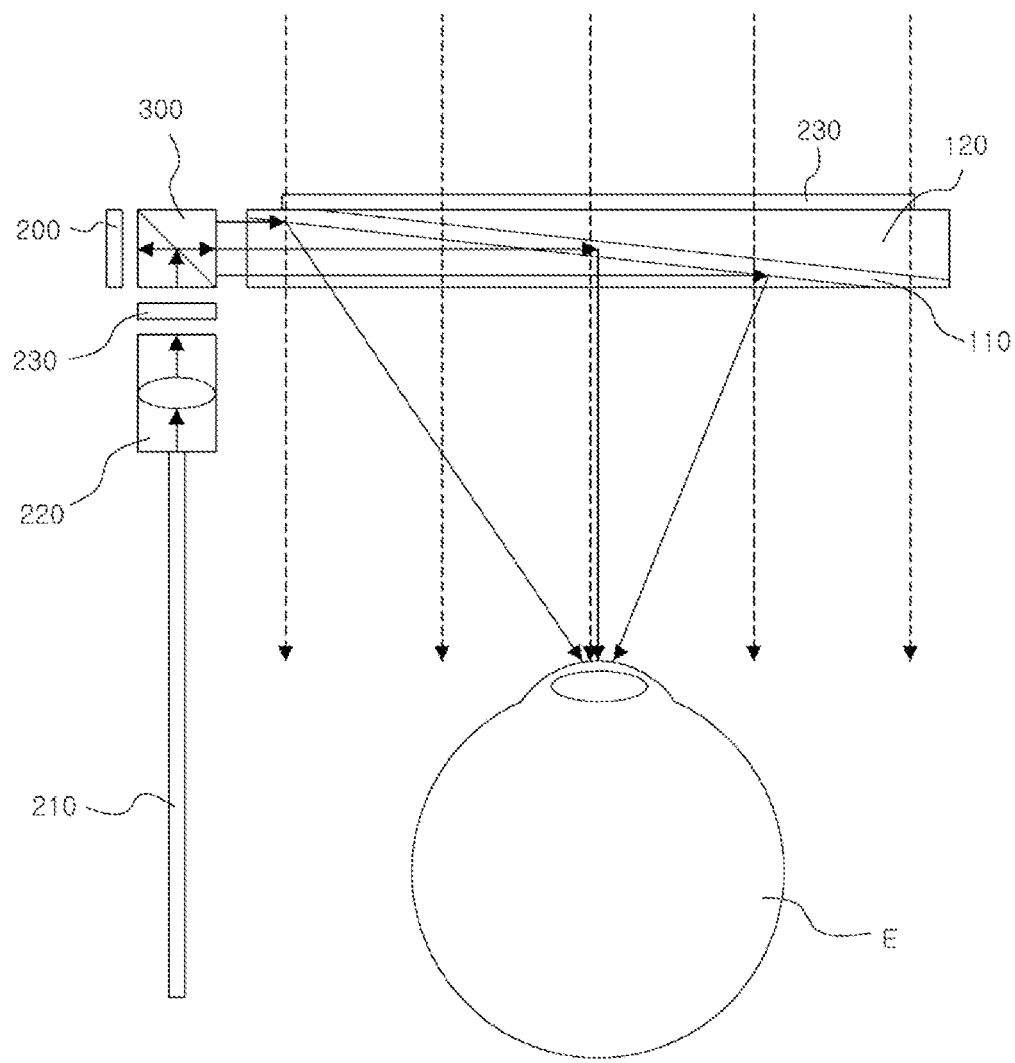
FIGS. 7 to 10 are exemplary views illustrating a configuration of a spatial light modulator (SLM) according to the embodiment of the present invention.
Figure 8:
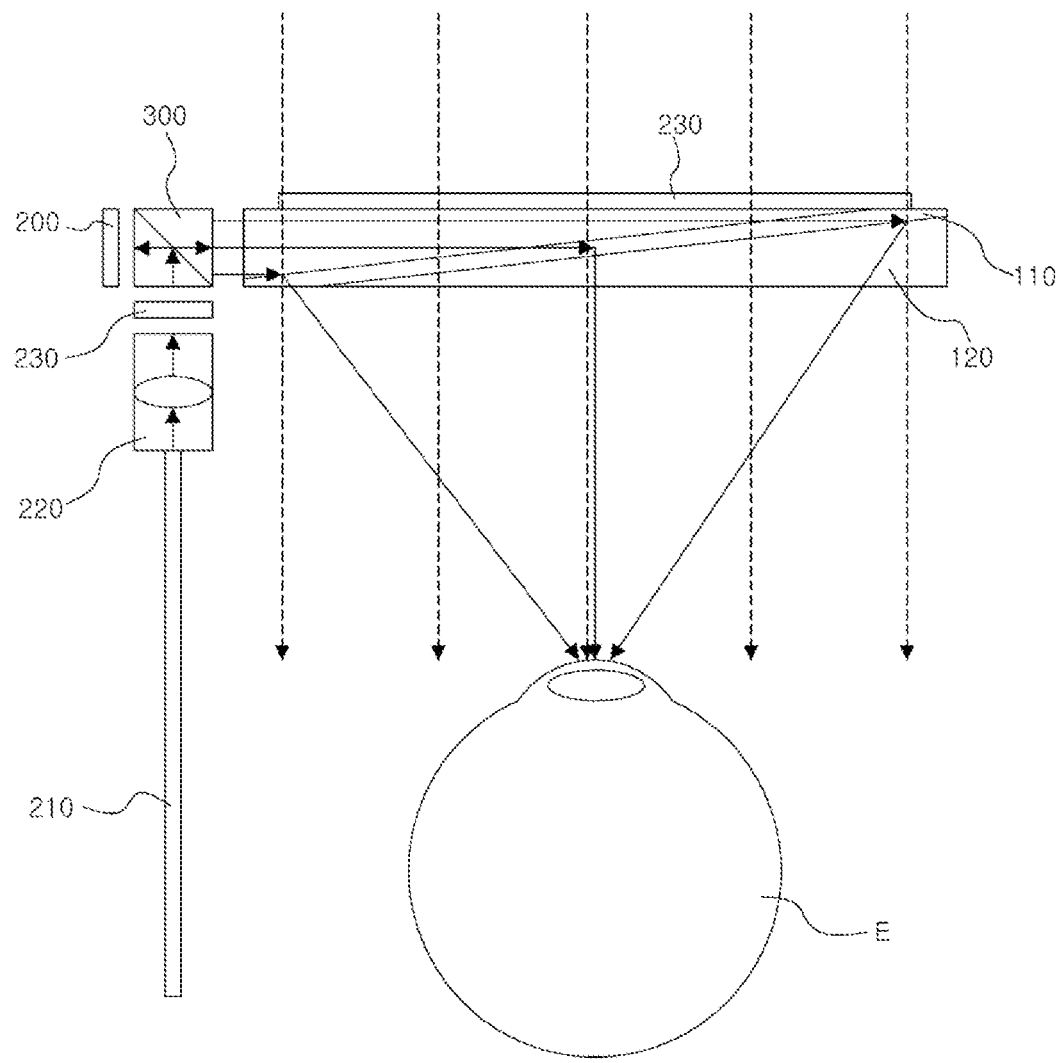

Before specific description, regarding the SLM 200 and the polarization-dependent lens 110 according to the embodiment of the present disclosure, as a method of synthesizing the virtual image and the external scene, a reflective SLM of the type as shown in FIGS. 7 and 9 may be used, and a transmissive SLM of the type as shown in FIGS. 8 and 10 may also be used.

Further, as described above, as one of the reflective combiner and transmissive combiner having the same purpose but different configurations is used, the polarization filter 230 may also be provided at a different position, and positions of the polarization-dependent lens 110, the SLM 200, and the polarization filter 230 shown in FIGS. 7 to 10 are only the most preferable embodiment for constituting the present invention, and may be changed within a range not departing from the purpose of synthesizing the virtual image and the external scene.

Hereinafter, with reference to the drawings, looking at the virtual image light waves transmitted according to the method of the polarization-dependent lens 110 according to the embodiment of the present invention in detail, first, the virtual image light waves optically modulated by the SLM 200 are incident on a side surface of the glass substrate 120 and meet the inclined polarization-dependent lens 110.

Next, since a proceeding direction of the virtual image is changed by the polarization-dependent lens 110, the virtual image converges to the eyes E.

First, in the case of the reflective combiner, the shape thereof shows a proceeding direction as shown in FIGS. 7 and 9, and in this case, a dotted line indicates the external scene, and a solid line indicates the proceeding direction of the virtual image.

Further, in the case of the transmissive combiner, the virtual image converges in the shape as shown in FIGS. 8 and 10, and like FIGS. 7 and 9, a dotted line indicates the external scene, and the solid line indicates the proceeding direction of the virtual image.

In addition, the polarization-dependent lens 110 operates as a lens for a light wave of a polarization state of specific light, and the virtual image of the light wave incident on the side surface converges in front of the eyes due to the polarization-dependent lens 110 which operates as a lens, and the external scene is polarized and modulated with opposite polarization to the virtual image which does not undergo a lens operation of the metalens, and passes through the metalens without modulation.

In addition, when the HOE is applied, since the virtual image which converges in front of the eyes and a DC component of the external scene not modulated by the HOE are observed, the overall system configuration of the present invention described above in detail shows the shape as in FIG. 6, and a virtual image IM may be transmitted to the user's eyes E.

Looking at the above-described configurations and operations in more detail with FIGS. 7 to 10 once again, the virtual image output from the SLM 200 passes through glass and passes through the polarization-dependent lens 110, that is, the metalens or HOE, and is bent 90 degrees and converges in front of the eyes.

Then, the converged virtual image forms an image in a frequency domain in front of the user's eyes, and only information for a three-dimensional image is filtered and observed by a user's pupils.

Meanwhile, the light of the external scene may be observed by the user without being modulated by the metalens and the HOE.

In this case, as the proposed combiner combines two images into one image, the user observes a virtual three-dimensional image and the external scene together.

Further, more specifically, FIGS. 11 and 12 for helping understanding of the present invention are exemplary views illustrating the energy of reference light and signal light according to a change in thickness of a hologram medium according to the embodiment of the present invention.

Referring to FIGS. 11 and 12, in the present invention, the energy of the reference light and the signal light may be exchanged with each other at 100%, and in the augmented reality display 1 with a thin optical combiner according to the embodiment of the present invention, since 100% of the energy of the reference light may be converted to the signal light, it is possible to acquire an image of superior quality compared to the conventionally used optical combiner.

More specifically, first, referring to FIG. 11, in the case of the display according to the embodiment of the present invention, due to the glass substrate 120 attached to a front and a back of the hologram medium, since there is a small refractive index difference with the hologram medium, and thus reflectance is low, there is an advantage in that energy at which multiple reflections occur in the hologram medium is small, and thus a clearer image may be acquired.

However, in the case of a conventionally used hologram medium structure, since only about 60% of the energy of the reference light may be converted to the energy of the signal light according to the change in the thickness of the hologram medium, and the energy at which the multiple reflections occur is large, there are disadvantages in that ripples occur sensitively with respect to the thickness of the hologram medium, and the thickness of the hologram medium should be precisely controlled.

Accordingly, as 100% of the energy of the reference light may be converted to the signal light, and an optical combiner 10 thinner than the conventional optical combiner is provided, the augmented reality display 1 with a thin optical combiner according to the embodiment of the present invention has an advantage of being simple and light to be used by a user, and a problem in that the thickness of the hologram medium derived from a conventional optical combiner part should be precisely controlled may be solved.

Further, the SLM 200 of the augmented reality display 1 with a thin optical combiner according to the embodiment of the present invention includes the polarization filter 230 which transmits polarized light in a specific state and blocks other wavelengths, and thus it has an advantage of being capable of providing a high-resolution synthetic image to a user.

Figure 13:
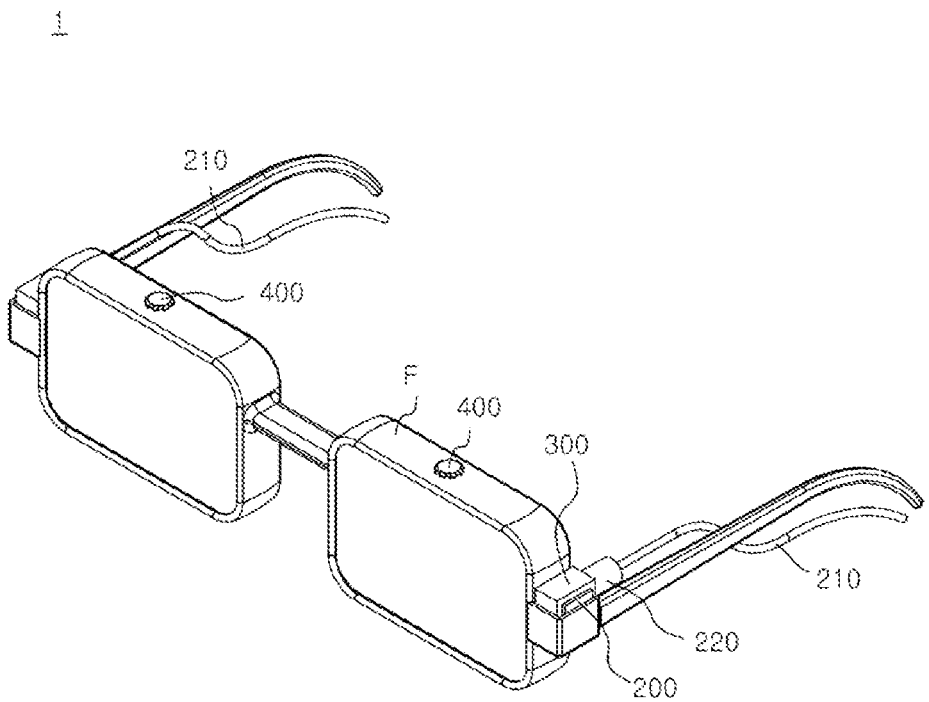
FIG. 13 is a perspective view of the augmented reality display with a thin optical combiner provided with an angle adjustment member according to the embodiment of the present invention.
Figure 14:
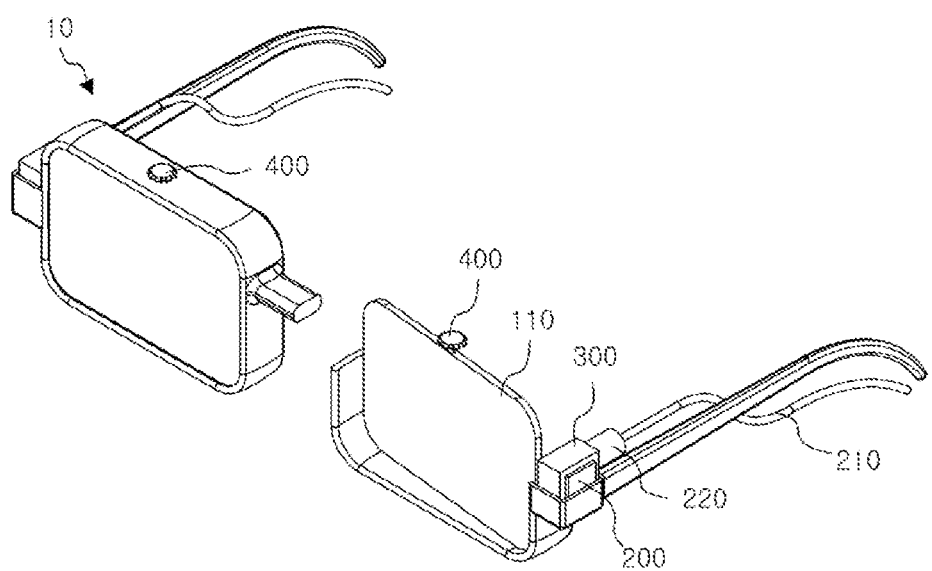
FIG. 14 is a partially omitted view illustrating a configuration in FIG. 13 in detail.
Figure 15:
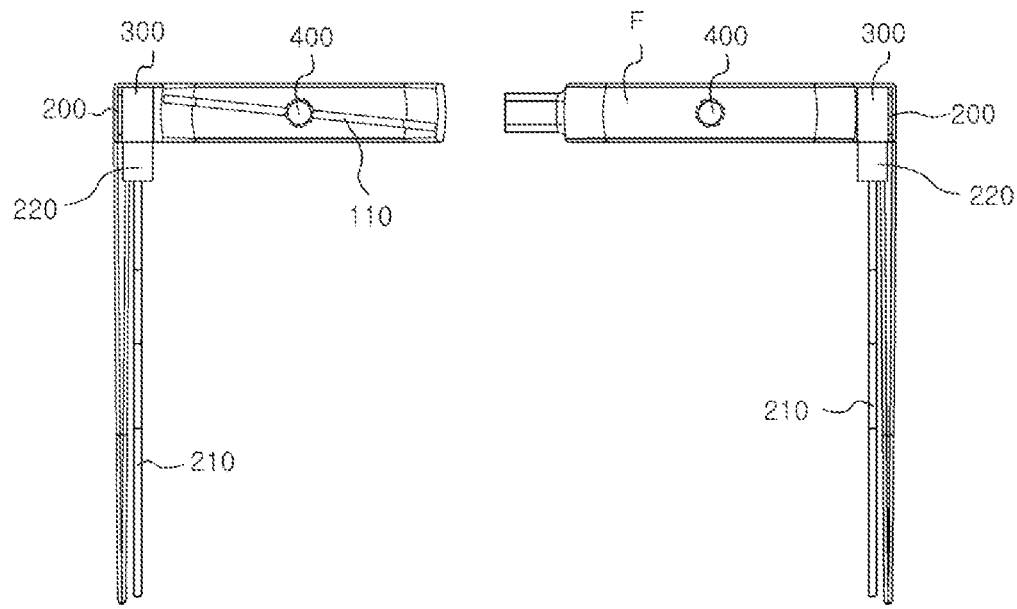

In addition, FIG. 13 is a perspective view of the augmented reality display with a thin optical combiner provided with an angle adjustment member according to the embodiment of the present invention, FIG. 14 is a partially omitted view illustrating a configuration in FIG. 13 in detail, and FIG. 15 is an exemplary view illustrating a case in which FIG. 14 is viewed from above.

Referring to FIGS. 13 to 15, the polarization-dependent lens 110 may be provided so that an angle may be varied with respect to the middle of the polarization-dependent lens 110.

A shape of a glasses frame F provided to surround a side surface edge of the polarization-dependent lens 110 may be formed to draw an arc shape with respect to an upper portion thereof.

Further, an angle of the glass substrate 120 provided in front of and behind a conventional polarization-dependent lens 110 may also be varied with respect to the middle of the polarization-dependent lens 110.

In addition, the angle of the polarization-dependent lens 110 may be differently varied through the angle adjustment member 400 provided to pass through an upper portion of the glasses frame F.

Accordingly, the augmented reality display 1 with a thin optical combiner according to the embodiment of the present invention has an advantage of being easily used compared to a conventionally used display as the user may directly control a focal angle of the polarization-dependent lens 110 by hand.

Figure 16:
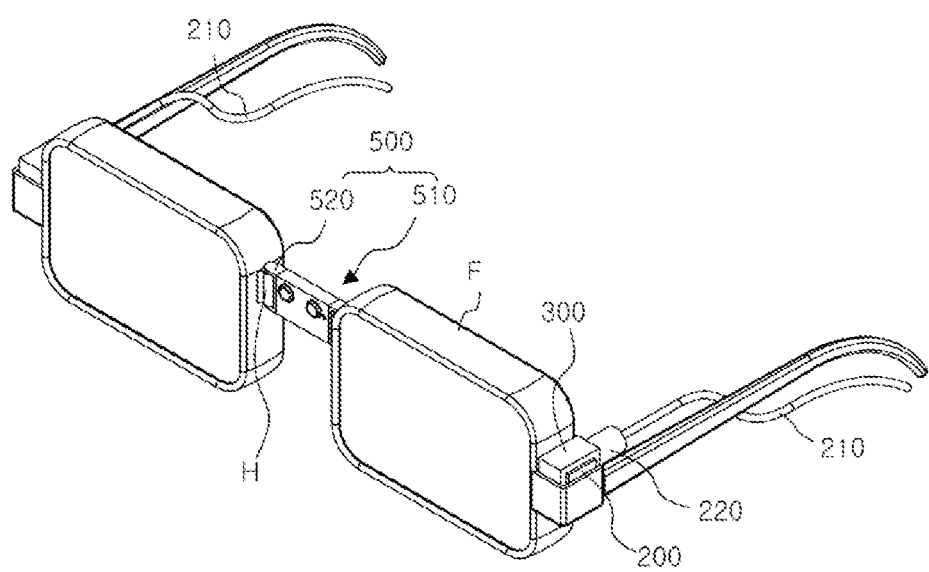
FIG. 16 is a perspective view of the augmented reality display with a thin optical combiner provided with a user modification module according to the embodiment of the present invention.
Figure 17:
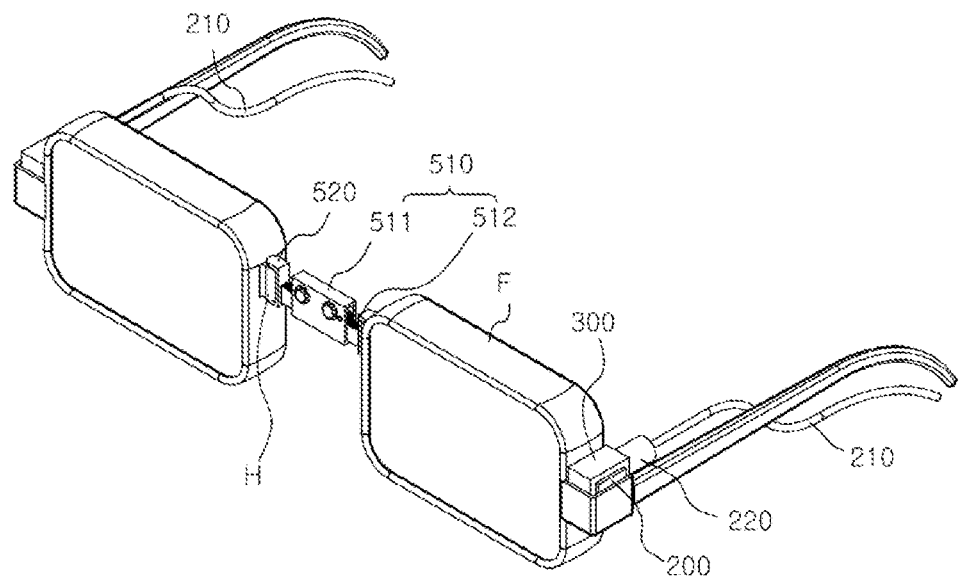
FIG. 17 is an exemplary view illustrating a case in which an interval adjustment part of the user modification module operates.
Figure 18:
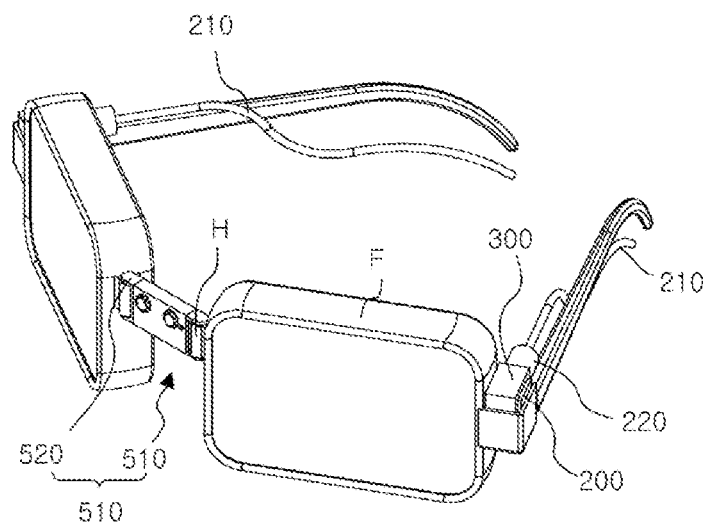
FIG. 18 is an exemplary view illustrating a case in which an angle adjustment part operates.

Further, FIG. 16 is a perspective view of an augmented reality display with a thin optical combiner provided with a user modification module according to the embodiment of the present invention, FIG. 17 is an exemplary view illustrating a case in which an interval adjustment part of the user modification module operates, and FIG. 18 is an exemplary view illustrating a case in which an angle adjustment part operates.

Referring to FIGS. 16 to 18, the augmented reality display 1 with a thin optical combiner according to the embodiment of the present invention may further include a user modification module 500 which varies a position and an angle of the optical combiner part 100 according to a position of the user's eyes To this end, the user modification module 500 may include an interval adjustment part 510 and an angle adjustment part 520.

First, the interval adjustment part 510 may adjust an interval between the polarization-dependent lenses 110 provided as a pair.

Specifically, the interval adjustment part 510 may include an interval adjustment housing 511 provided between the pair of polarization-dependent lenses 110 and an interval adjustment frame 512 coupled to the interval adjustment housing 511 to adjust the interval through horizontal movement.

In this case, as shown in FIG. 17, the interval of the interval adjustment part 510 may be adjusted by a combination of a gear and a pinion provided between the polarization-dependent lenses 110 forming a shape of a lens part, but this is only a preferable embodiment, and all mechanical devices for adjusting the interval between the polarization-dependent lenses 110 may be included.

Further, the angle adjustment part 520 may be provided at both ends of the coupling part between the polarization-dependent lenses 110 provided as a pair to adjust the angle of the polarization-dependent lenses 110.

More specifically, as shown in FIG. 18, the angle of the angle adjustment part 520 may be varied by a hinge H provided at an edge of the lens part to which the polarization-dependent lenses 110 are coupled.

Accordingly, the augmented reality display 1 with a thin optical combiner according to the embodiment of the present invention varies the angle and interval of the polarization-dependent lenses 110 which synthesize an image, and thus is variable and has excellent compatibility even when the position and height of the user's eyes E are changed.

Figure 19:
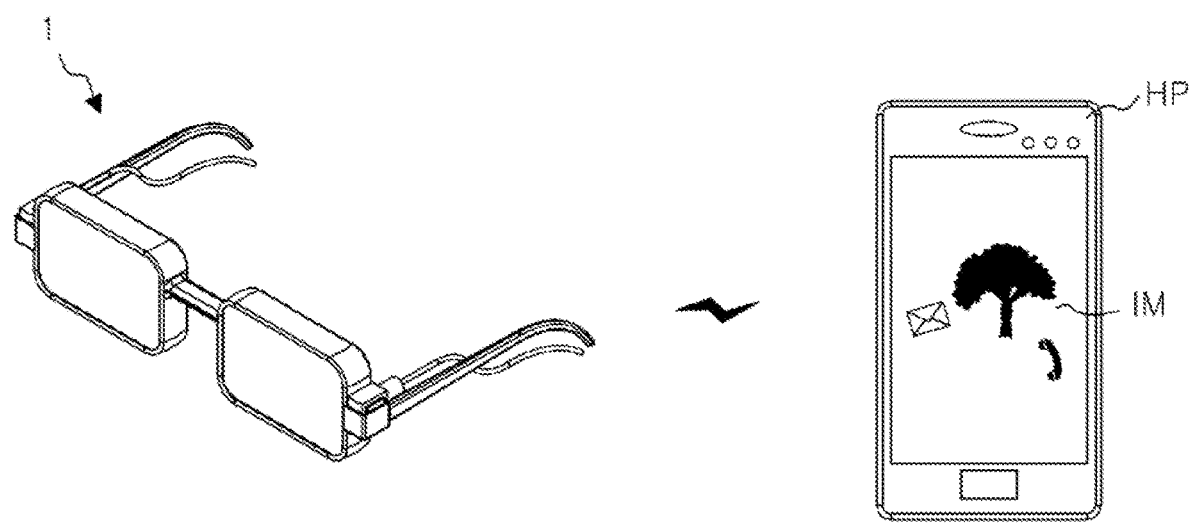
FIG. 19 is an exemplary view illustrating a user terminal according to the embodiment of the present invention.

Further, FIG. 19 is an exemplary view illustrating a user terminal according to the embodiment of the present invention.

Referring to FIG. 19, the augmented reality display 1 with a thin optical combiner according to the embodiment of the present invention may further include a user terminal HP.

Here, the user terminal HP may show the virtual image IM viewed by the user using the augmented reality display 1 with a thin optical combiner.

That is, as a screen viewed by the user wearing the augmented reality display 1 with a thin optical combiner may be viewed together by others, the augmented reality display 1 with a thin optical combiner according to the embodiment of the present invention may share contents of the screen viewed by the user with other users, and has an advantage in that an administrator who manages the augmented reality display 1 with a thin optical combiner or provides the virtual image IM may easily understand and control the contents of the virtual image IM viewed by the user.

Figure 20:
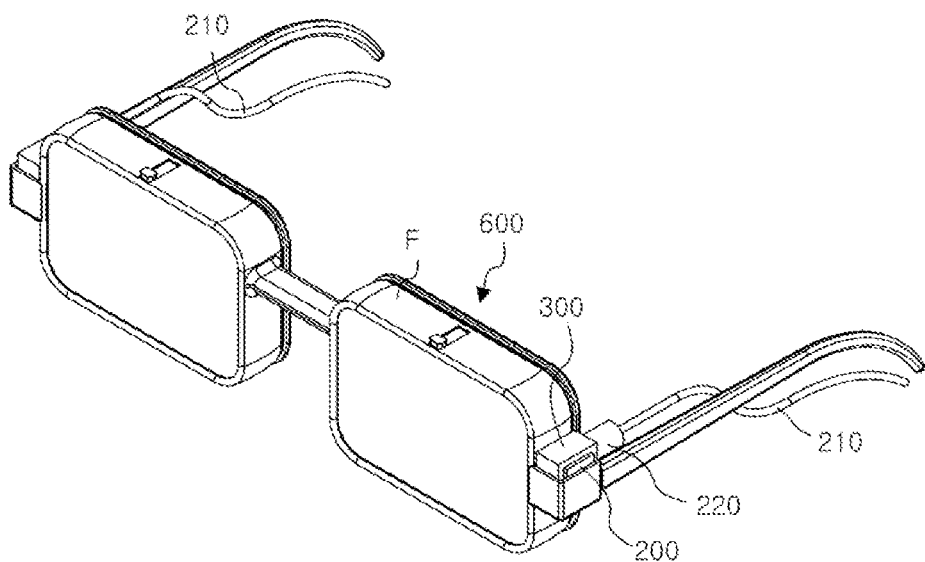
FIGS. 20 and 21 are exemplary views illustrating the operation of a variable shielding film according to the embodiment of the present invention.
Figure 21:
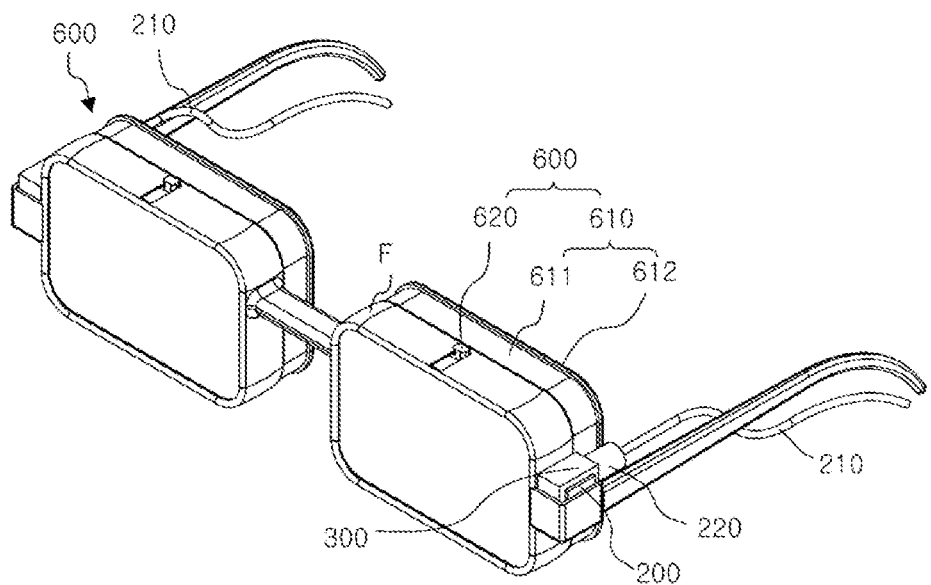

Finally, FIGS. 20 and 21 are exemplary views of the operation of a variable shielding film according to the embodiment of the present invention.

Referring to FIGS. 20 and 21, the augmented reality display 1 with a thin optical combiner according to the embodiment of the present invention may include a variable shielding film 600.

Specifically, the variable shielding film 600 is a configuration drawn out in a direction toward a user's face to block interference light which penetrates at a side surface between the augmented reality display 1 with a thin optical combiner and the user's face.

To this end, the variable shielding film 600 may include a shielding film member 610 provided in an outer peripheral edge of the glasses frame F, and a shielding film handle 620 provided at one side of the shielding film member 610 and capable of extending and returning by a user's hand.

Further, the shielding film member 610 may include a fixing member 611 formed of a hard material which prevents the shielding film member 610 drawn out in the direction toward the user's face from sagging downward by gravity, and a flexible member 612 of which a shape is variable to come into close contact with the user's face.

Accordingly, the augmented reality display 1 with a thin optical combiner according to the embodiment of the present invention further includes the variable shielding film 600 to block the interference light which penetrates at the side surface between the augmented reality display 1 with a thin optical combiner and the user's face, and thus has an advantage of excellent visibility.

In the above, although the augmented reality display 1 with a thin optical combiner according to the embodiment of the present invention has been described with reference to FIGS. 1 to 21, it is not only implemented through the described device and/or method, but also may be implemented through a program for realizing a function corresponding to the configuration of the embodiment of the present invention, a recording medium in which the program is stored therein, or the like, and this implementation may be easily implemented by those skilled in the art from the description of the above-described embodiment.

Further, in the above, although the embodiment of the present invention has been described in detail, the scope of the present invention is not limited thereto, and various modifications and improvements by those skilled in the art using the basic concept of the present invention as defined in the following claims are also included in the scope of the present invention.

REFERENCE NUMERALS

| | |
|---|---|
| 1: augmented reality display with thin optical combiner | |
| 100: optical combiner part | |
| 110: polarization-dependent lens | 120: glass substrate |
| 200: SLM | |
| 210: optical fiber | 220: collimator |
| 230: polarization filter | |
| 300: light distributor | |
| 400: angle adjustment member | |
| 500: user modification module | |
| 510: interval adjustment part | 511: interval adjustment housing |
| 512: interval adjustment frame | |
| 520: angle adjustment part | |
| 600: variable shielding film | 610: shielding film member |
| 611: fixing member | 612: flexible member |
| 620: shielding film handle | |
| E: eye | F: glasses frame |
| H: hinge | |
| HP: user terminal | IM: virtual image |

The invention claimed is:

1. An augmented reality display having an optical combiner and configured to be viewed by eyes of a user, the augmented reality display comprising:
   an optical combiner part configured to receive virtual image light waves and combine an external scene and a virtual image,
   wherein the optical combiner part comprises:
   a plurality of glass substrates; and
   a polarization-dependent lens disposed obliquely in a diagonal direction between the plurality of glass substrates to transmit optically modulated virtual image light waves in a direction toward the eyes of the user,
   wherein the optical combiner part further comprises:

a light distributor configured to distribute the virtual image light waves to a spatial light modulator (SLM); and the spatial light modulator (SLM) configured to optically modulate the virtual image light waves and transmit the optically modulated virtual image light waves to the polarization-dependent lens.

2. The augmented reality display of claim 1, wherein the polarization-dependent lens is a reflective polarization-dependent lens or a transmissive polarization-dependent lens.

3. The augmented reality display of claim 1, wherein the SLM comprises:

an optical fiber configured to transmit the virtual image light waves;

a collimator configured to convert the virtual image light waves transmitted from the optical fiber to a parallel light source; and a polarization filter configured to receive the parallel light source generated by the collimator, transmit a wavelength in a specific state in a direction toward the light distributor, and block other wavelengths.

4. The augmented reality display of claim 1, wherein an angle of the polarization-dependent lens is variable with respect to a middle of the polarization-dependent lens.

5. The augmented reality display of claim 1, further comprising a user modification module configured to vary a position and an angle of the optical combiner part according to a position of the eyes of the user, wherein the polarization-dependent lens comprises a pair of lenses, and the user modification module comprises:

an interval adjustment part configured to adjust an interval between the polarization-dependent lenses; and an angle adjustment part disposed at both ends of a coupling part between the polarization-dependent lenses and configured to adjust an angle of the polarization-dependent lenses.

6. The augmented reality display of claim 1, further comprising a user terminal showing a screen viewed by the user using the augmented reality display.

7. The augmented reality display of claim 1, further comprising a variable shield disposed in a direction toward a face of the user to block interference light which penetrates at a side surface between the augmented reality display and the face of the user.

8. An augmented reality display having an optical combiner and configured to be viewed by eyes of a user, the augmented reality display comprising:

an optical combiner part configured to receive virtual image light waves and combine an external scene and a virtual image; and a variable shield disposed in a direction toward a face of the user to block interference light which penetrates at a side surface between the augmented reality display and the face of the user, wherein the optical combiner part comprises:

a plurality of glass substrates; and a polarization-dependent lens disposed obliquely in a diagonal direction between the plurality of glass substrates to transmit optically modulated virtual image light waves in a direction toward the eyes of the user.

9. The augmented reality display of claim 8, wherein the polarization-dependent lens is a reflective polarization-dependent lens or a transmissive polarization-dependent lens.

10. The augmented reality display of claim 8, wherein the optical combiner part further comprises:

a light distributor configured to distribute the virtual image light waves to a spatial light modulator (SLM); and the spatial light modulator (SLM) configured to optically modulate the virtual image light waves and transmit the optically modulated virtual image light waves to the polarization-dependent lens, and wherein the SLM comprises:

an optical fiber configured to transmit the virtual image light waves;

a collimator configured to convert the virtual image light waves transmitted from the optical fiber to a parallel light source; and a polarization filter configured to receive the parallel light source generated by the collimator, transmit a wavelength in a specific state in a direction toward the light distributor, and block other wavelengths.

11. The augmented reality display of claim 8, wherein an angle of the polarization-dependent lens is variable with respect to a middle of the polarization-dependent lens.

12. The augmented reality display of claim 8, further comprising a user modification module configured to vary a position and an angle of the optical combiner part according to a position of the eyes of the user, wherein the polarization-dependent lens comprises a pair of lenses, and the user modification module comprises:

an interval adjustment part configured to adjust an interval between the polarization-dependent lenses; and an angle adjustment part disposed at both ends of a coupling part between the polarization-dependent lenses and configured to adjust an angle of the polarization-dependent lenses.

13. The augmented reality display of claim 8, further comprising a user terminal showing a screen viewed by the user using the augmented reality display.

14. An augmented reality display having an optical combiner and configured to be viewed by eyes of a user, the augmented reality display comprising:

an optical combiner part configured to receive virtual image light waves and combine an external scene and a virtual image, wherein the optical combiner part comprises:

a plurality of glass substrates; and a polarization-dependent lens disposed obliquely in a diagonal direction between the plurality of glass substrates to transmit optically modulated virtual image light waves in a direction toward the eyes of the user, wherein an angle of the polarization-dependent lens is variable with respect to a middle of the polarization-dependent lens.

\* \* \* \* \*